United States Patent [19]
Culter et al.

[11] Patent Number: 5,457,551
[45] Date of Patent: Oct. 10, 1995

[54] FRAME RESPONSE COMPENSATED, VIDEO RATE ADDRESSABLE LIQUID CRYSTAL PASSIVE MATRIX DISPLAY SYSTEM

[75] Inventors: Robert G. Culter; Keith F. Kongslie, both of Beaverton, Oreg.

[73] Assignee: Planar Systems, Inc., Beaverton, Oreg.

[21] Appl. No.: 133,700

[22] Filed: Oct. 8, 1993

[51] Int. Cl.$^6$ .................. G02F 1/1347; G02F 1/137; G09G 3/36
[52] U.S. Cl. ................. 359/53; 359/55; 359/73; 359/103; 345/87
[58] Field of Search ................. 359/54, 53, 73, 359/103, 55, 93, 87, 85; 345/87, 94; 348/761, 766

[56] References Cited

U.S. PATENT DOCUMENTS

| | | | |
|---|---|---|---|
| 4,952,036 | 8/1990 | Gulick et al. | 350/335 |
| 5,035,489 | 7/1991 | Iijima et al. | 359/53 |
| 5,090,794 | 2/1992 | Hatano et al. | 359/53 |
| 5,124,818 | 6/1992 | Conner et al. | 359/53 |
| 5,272,553 | 12/1993 | Yamamoto et al. | 359/53 |

FOREIGN PATENT DOCUMENTS

| | | | |
|---|---|---|---|
| 0379241 | 7/1990 | European Pat. Off. | 359/53 |
| 507061A2 | 7/1992 | European Pat. Off. | G09G 3/36 |
| 0204725 | 8/1990 | Japan | 359/53 |

OTHER PUBLICATIONS

Conner, Arlie R. and Gulick, Paul E., "High–Resolution Display System based on Stacked Mutually Compensated STN–LCD Layers," *SID 91 Digest*, 1991, pp. 755–757.

Scheffer, Terry and Nehring, Jürgen, "Supertwisted Nematic (STN) LCDs," *1993 SID International Symposium*, May 16–21, 1993, pp. M 7/1–M 7/63.

Takahashi, Taiju and Saito, Susumu; "Improvement of Multiplexability of Double–Layered Homogeneously Oriented Nematic LCD by Simultaneous Driving Method"; *Electronics and Communications in Japan, Part II*; vol. 74, No. 12; 1991; pp. 49–58.

*Primary Examiner*—William L. Sikes
*Assistant Examiner*—Tai V. Duong

[57] ABSTRACT

A display system (10) uses an electrically driven compensator cell (16) not only to improve the color quality of the display system but also to solve viewability problems stemming from the frame response effect. The display system includes a liquid crystal cell (14) patterned as a matrix display device and the compensator cell patterned in a row-only fashion. Corresponding row electrodes (26, 32) of the matrix display cell and the compensator cell are concurrently driven from the same row driver circuit (40). The cells are constructed and oriented relative to each other so as to cancel unwanted polarization state changes resulting from the frame response effect. The resulting light transmission through the display system in the OFF optical state is substantially at a minimum at all times during a frame period.

10 Claims, 4 Drawing Sheets

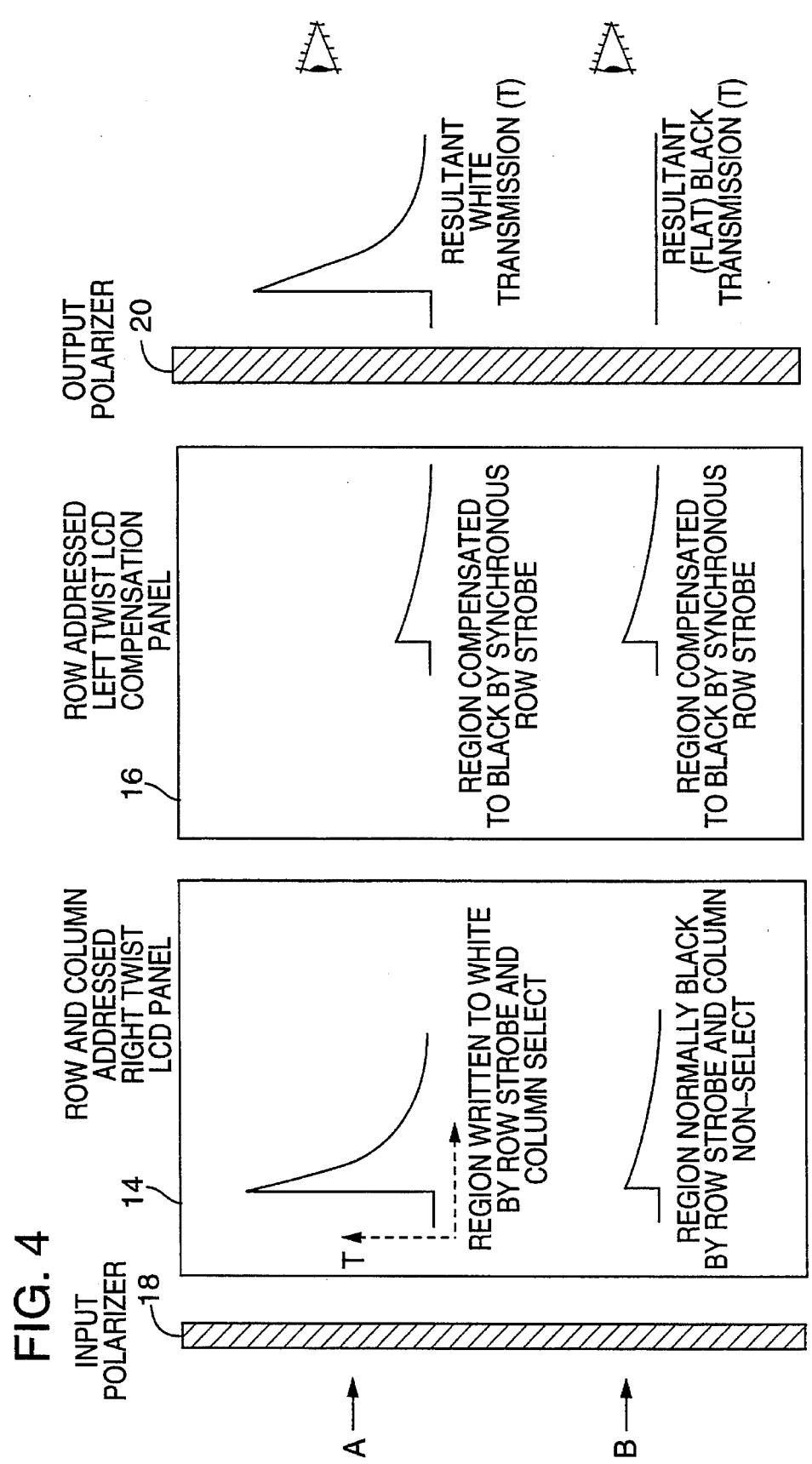

FRAME RESPONSE COMPENSATED, VIDEO RATE ADDRESSABLE LIQUID CRYSTAL PASSIVE MATRIX DISPLAY SYSTEM

TECHNICAL FIELD

The present invention relates to matrix display systems and, in particular, to a matrix display system whose display elements are optically compensated to prevent a decrease in contrast ratio caused by a frame response effect.

BACKGROUND OF THE INVENTION

A passive matrix liquid crystal display ("LCD") is one popular type of display whose display elements respond to the values of the rms voltages applied across them. A passive matrix LCD includes overlapping row electrodes and column electrodes positioned on opposite sides of a film of liquid crystal material. The locations where the row and column electrodes overlap define the display elements. The portion of liquid crystal film associated with each display element is an electro-optic material that responds to a change in the value of an rms voltage applied across the display element to provide a corresponding change in the amount of light passing through it. The liquid crystal device most prevalently used in such displays is of a supertwisted nematic ("STN") type. The row electrodes receive addressing signals that select the rows at various times, and the column electrodes receive data signals that represent the information patterns to be displayed.

There are optimum values of the rms voltages that can be applied across the display elements to provide light transmitting ("ON") and light blocking ("OFF") optical states. For standard addressing, the rows are sequentially selected typically with a 21-volt pulse, and the display system requires a 16.7 millisecond repetition period to select all of the rows one at a time. These row addressing waveforms, which are called Alt and Pleshko waveforms, are normally used to provide the optimum voltages, but they are of highly nonuniform amplitude as a function of time.

If it can respond within the repetition period of the row select waveforms, an LCD will not respond to the true rms value of the waveforms. This phenomenon is called a "frame response" effect. The frame response causes the transmission characteristic of the LCD to be different from that which is intended. For example, a display element driven to remain in the OFF optical state in successive frames will leak light during a portion of the frame period. The result is a lower contrast ratio for the display element. If an LCD is constructed to respond sufficiently fast so that its display elements switch at video rates, the frame response effect can become so severe that it is difficult to make a passive matrix LCD that is capable of displaying video rate images.

Two approaches have been used to solve the frame response effect problem. One approach is to increase the frame rate of the Alt and Pleshko waveforms, and the other approach is use waveforms whose amplitudes are more uniform with time.

The first approach has two difficulties. One difficulty is that the row and column signal drivers need to operate at higher than normal rates, thereby increasing circuit complexity and power consumption. The second difficulty is that signals of higher frequencies are applied to the row and column electrodes of the display. Because the row electrodes are of high resistance and the row signals drive significant capacitance, the use of higher frequency signals makes it difficult to maintain the desired voltage levels across the display elements down the rows and columns of the display. The second approach, which is sometimes called "active addressing," requires more complex drive circuit electronics.

STN displays are often coupled with compensator cells or sheets of compensator material to improve the color quality (i.e., by making a black-and-white display instead of a blue-and-white or a yellow-and-black display) and improve the viewing angle performance. An electrically driven compensator cell includes a second STN liquid crystal cell of opposite liquid crystal molecular helical twist direction that offsets the birefringence resulting from color dispersion effects of the STN display cell. The compensator cell does not usually contain patterned row or column electrodes.

SUMMARY OF THE INVENTION

An object of the present invention is, therefore, to provide a matrix LCD that is capable of presenting images at video rates.

Another object of the invention is to provide such a system with enhanced viewability properties.

A further object is to provide such a system that uses standard Alt and Pleshko waveforms at normal addressing rates.

The present invention is a display system that uses an electrically driven compensator cell not only to improve the color quality of the display system but also to solve viewability problems stemming from the frame response effect. The presence of frame response causes nonuniform light leakage through display elements in the OFF optical state and nonuniform light transmission through display elements in the ON optical state. Thus, during a frame period the time-dependent contrast ratio of the ON optical state to the OFF optical state varies. (A frame period is defined as the length of time required for all of the row electrodes to be selected one at a time before an addressing cycle repeats.)

The display system includes a liquid crystal cell patterned as a matrix display device and a compensator cell patterned in a row-only fashion. The row electrodes of the matrix display cell and the compensator cell are driven from the same row driver circuit. The compensator cell has its own frame response that is equal to the frame response of the matrix display cell. The column electrodes of the matrix display cell receive drive signal voltages representing display pattern information stored by the display elements, and a back plane common electrode of the compensator cell receives a constant nonselect drive voltage throughout the frame period. The cells are constructed and oriented relative to each other so as to cancel unwanted polarization state changes resulting from the frame response effect. The resulting light transmission through the display system in the OFF optical state is substantially at a minimum at all times during the frame period. The display system is, therefore, operable with a constant output backlight.

The present invention greatly improves the performance of passive matrix LCDs in a large number of applications such as laptop and notebook computers; television; and projection, instrumentation, and avionics displays.

Additional objects and advantages of the present invention will be apparent from the following detailed description of preferred embodiments thereof, which proceeds with reference to the accompanying drawings.

BRIEF DESCRIPTION OF THE DRAWINGS

FIG. 4 is a diagram showing the progressive optical processing of light propagating through the matrix display and compensator cells in the ON and OFF optical states.

DETAILED DESCRIPTION OF THE INVENTION

Figure 1:
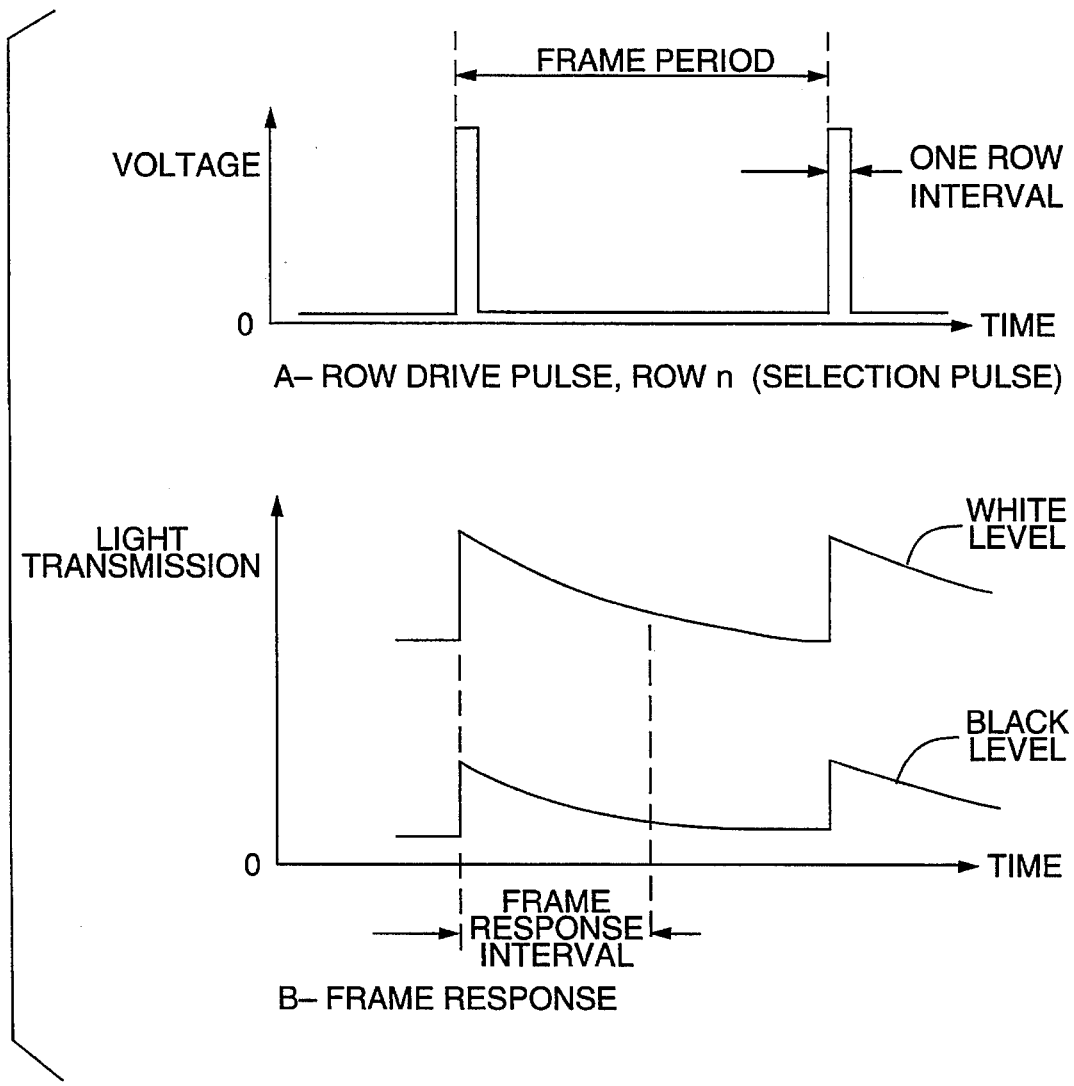
FIG. 1 shows the timing relationship between selection pulses applied to a row electrode and the resulting frame response effect for the ON and OFF optical states.

FIG. 1 shows the timing relationship between a selection pulse applied to a row electrode (line A) and the corresponding frame response effect for a display element of a liquid crystal matrix display cell with the display element in the ON (white) and OFF (black) optical states (line B) during a frame period. The frame response interval shown in FIG. 1 (line B) results from undesired amounts of birefringence imparted to light propagating through a liquid crystal cell of the variable optical retardation type. The present invention is a display system that incorporates a compensator liquid crystal cell whose optical retardation produces a second frame response effect that offsets that of the matrix display liquid crystal cell.

Figure 2:
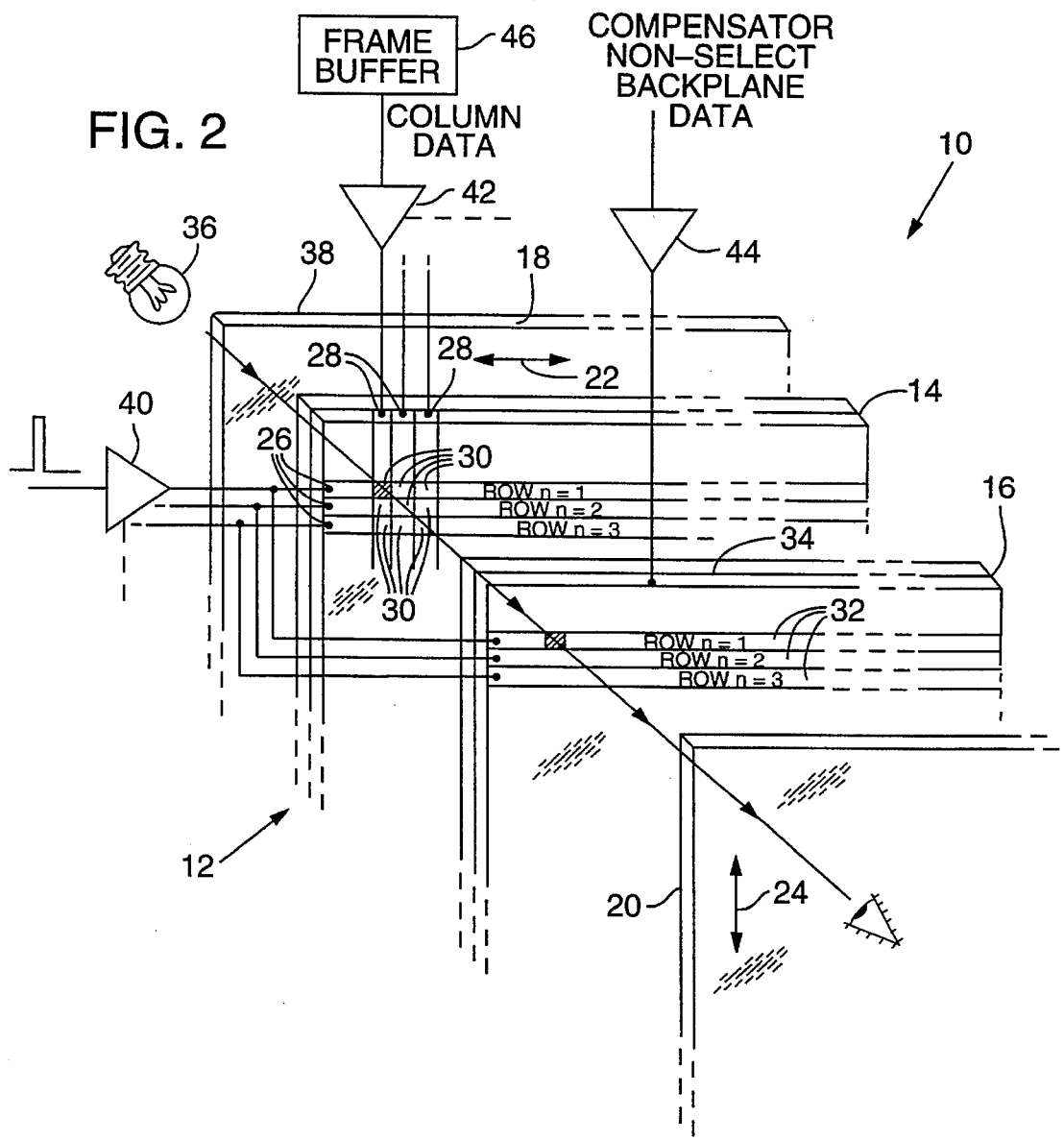
FIG. 2 is an exploded isometric view of a display system showing the electrical drive connections for, and the relative orientation of, the matrix display cell and compensator cell of the invention.

FIG. 2 shows the electrical connections for, and optical components of, a display system 10 designed in accordance with the present invention. With reference to FIG. 1, display system 10 includes a passive matrix liquid crystal panel 12 that comprises liquid crystal matrix display cell 14 positioned face to face to a liquid crystal compensator cell 16. Passive matrix panel 12 is positioned between a pair of neutral density linear polarizers 18 and 20 whose respective transmission axes 22 and 24 are orthogonally aligned. Matrix display cell 14 includes multiple, parallel first or row electrodes 26 that extend in one direction and multiple, parallel second or column electrodes 28 that overlap and extend in a direction perpendicular to that of row electrodes 26. Row electrodes 26 and column electrodes 28 are positioned on opposite sides of the liquid crystal material, and the locations where electrodes 26 and column electrodes 28 overlap define display elements 30. Compensator cell 16 includes multiple, parallel third or row electrodes 32 that are parallel to and are spatially aligned with row electrodes 26. There are no separate column electrodes provided on compensator cell 16, but there is a common electrode 34 covering a back plane of compensator cell 16. A continuous-illumination light source 36 is positioned adjacent a surface 38 of polarizer 18 and functions as a continuous backlight for display system 10.

To address display system 10, a row driver circuit 40 concurrently provides to row electrodes 26 of matrix display cell 14 and row electrodes 32 of compensator cell 16 drive signals of the standard Alt and Pleshko waveform type to sequentially select corresponding pairs of all of row electrodes 26 and 32 one pair at a time during a frame period. Thus, for a display matrix cell 14 and a compensator cell 16 each having N total number of rows, row driver circuit 40 selects at the nth time interval the nth pair of row electrodes 26 and 32, where n=1, 2, ..., N.

During the selection of each pair of row electrodes 26 and 32, a column driver circuit 42 provides to column electrodes 28 drive signals whose voltages represent display pattern information stored by the display elements 30 defined by the selected row 26 of matrix display cell 14 and spatially aligned with the selected row electrode 32 of compensator cell 16. A voltage driver 44 applies to common electrode 34 a constant nonselect data voltage throughout a frame period. The image data presented for display by display elements 30 are stored in an image data frame buffer 46, whose contents are continually updated by a host computer or other image data source (not shown). Frame buffer 46 and row driver circuit 40 communicate to synchronize the delivery to column electrodes 28 image data signals corresponding to the selected electrodes 26 of matrix display cell 14 and selected row electrodes 32 of compensator cell 16.

The present invention uses a row electrode-only addressed compensator cell 16 of perpendicular alignment direction to that of matrix display cell 14 to rotate the unwanted polarization direction resulting from the frame response effect to achieve high contrast during the entire frame period. The row signals applied to compensator cell 16 are the same as those applied to matrix display cell 14. (It will be appreciated, however, that the row signals applied to matrix display cell 14 may be phase-displaced by 180 degrees relative to the row signals applied to compensator cell 16.) Compensator cell 16 also thermally tracks temperature-related changes in matrix display cell 14 so as to provide thermal compensation.

Figure 3:
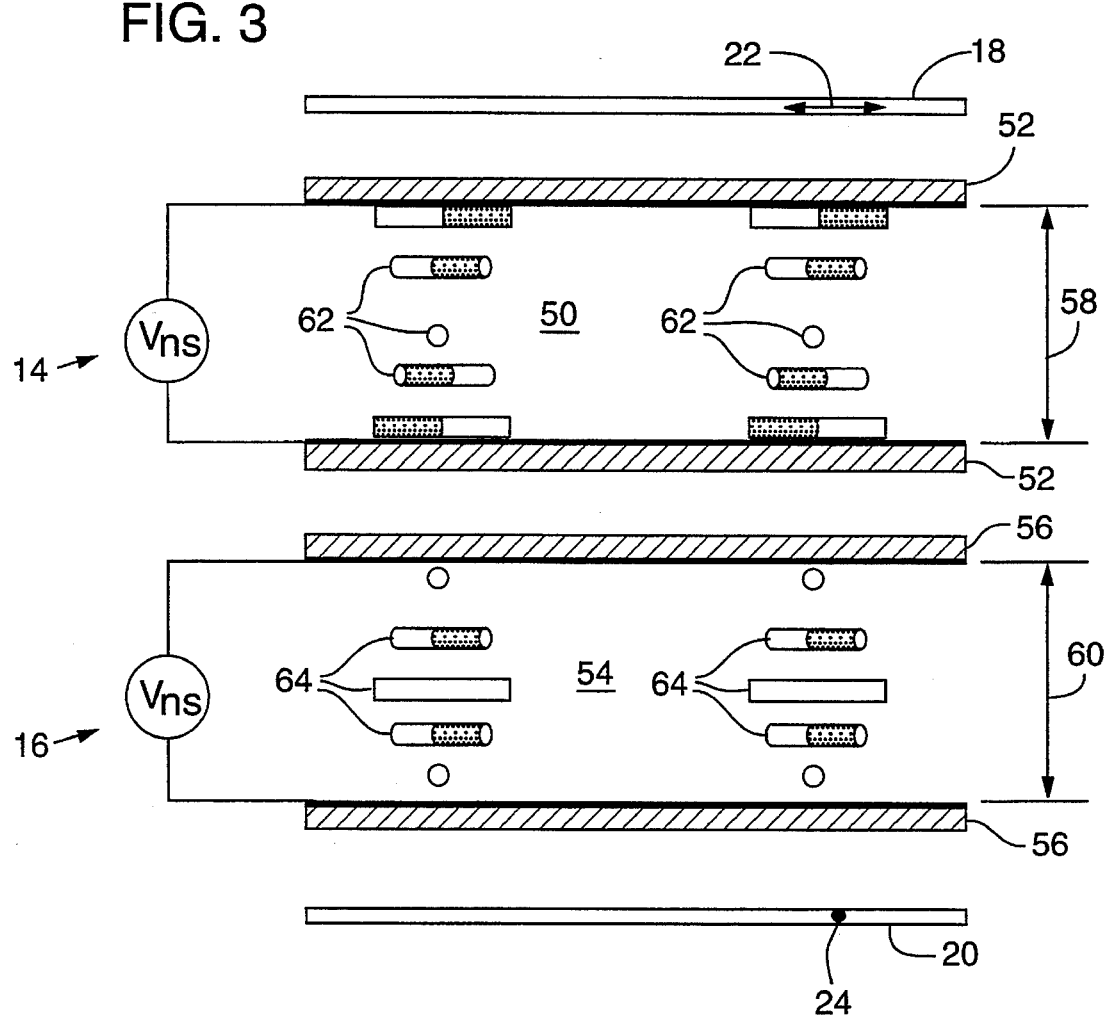
FIG. 3 is an exploded side elevation view of the display system of the invention showing the relative helical twist directions of the liquid crystal directors of the display matrix cells in their nonselected conditions.

FIG. 3 shows a side view of display system 10 with the interior sections of display matrix cell 14 and compensator cell 16 expanded to depict the rotational direction of the liquid crystal directors in their nonselected condition (as indicated by $V_{ns}$ applied across each of cells 14 and 16). Matrix display cell 14 and compensator cell 16 are of a supertwisted nematic type. Matrix display cell 14 comprises a nematic liquid crystal material 50 contained between optically transparent electrode structures 52, and compensator cell 16 comprises a nematic liquid crystal material 54 contained between optically transparent electrode structures 56.

A suitable matrix display cell 14 can be adapted from a Tektronix Part No. HTD-2561 Hypertwist™ Flat Panel Display, which includes an STN matrix having a 250-degree molecular helical twist along its thickness dimension 58. The molecular twist angle is determined by the relative alignment directions of electrode structures 52 and the type and amount of chiral additive to liquid crystal material 50. A suitable compensator cell 16 would require appropriate modification of the STN matrix in the HTD-2561 display to have along its thickness dimension 60 a 250-degree molecular helical twist of opposite rotational sense to that of matrix display cell 14 and preferably to include not separate column electrodes but a common back plane electrode 34. Matrix display cell 14 and compensator cell 16 are alike in all other respects.

With reference to FIG. 3, in display system 10, matrix display cell 14 and compensator cell 16 are oriented so that their optic axes established by their alignment directions are set at a 90 degree angle relative to each other and at 45 degree angles relative to the transmission axes 22 and 24 of the respective polarizers 18 and 20. Directors 62 of liquid crystal material 50 of matrix display cell 14 are depicted to have a right-handed molecular helical twist along its thickness dimension 58, and directors 64 of liquid crystal material 54 of compensator cell 16 are depicted to have a left-handed molecular helical twist along its thickness dimension 60. Cells 14 and 16 are of the same thickness and therefore have the same molecular pitch.

FIG. 4 shows the progressive optical processing of light propagating through a display element 30 of matrix display cell 14 and corresponding region of compensator cell 16 in the ON optical state (line A) and the OFF optical state (line B). Compensator cell 16 is set to impart nearly zero retardation to light propagating through it in the ON and OFF optical states of display system 10.

Line A shows the frame response effect that occurs when the voltage across the selected display element 30 of matrix display cell 14 is sufficiently small that the molecules of liquid crystal material 50 impart to light exiting polarizer 18 an amount of retardation causing an effective polarization direction rotation of 90 degrees. The overall quantity of light exiting polarizer 20 is diminished by an amount corresponding to the amount of retardation associated with the frame response of the selected row electrode 32 of compensator cell 16. This is so because the effect of compensator cell 16 is to contribute an amount of negative retardation corresponding to the OFF optical state of matrix display cell 14 to impart to the light striking polarizer 20 a net effective polarization direction rotation of nearly 90 degrees. Thus, minor and major quantities of light propagating through compensator 16 are, respectively, absorbed and transmitted by polarizer 20.

Line B shows the frame response effect that occurs when the voltage across the selected display element 30 of matrix display cell 14 is sufficiently large that the molecules of liquid crystal material 50 impart to light exiting polarizer 18 an amount of retardation causing an effective polarization direction rotation of nearly zero degrees. If compensator cell 16 were not present, the effective polarization direction rotation would result in a quantity of light exiting polarizer 20. The quantity of light exiting polarizer 20 is, however, zero because matrix display cell 14 and compensator cell 16 develop equal but opposite amounts of retardation and therefore impart to the light striking polarizer 20 a zero degree net polarization direction rotation. Thus, no light is transmitted by polarizer 20.

FIG. 4 shows that in the preferred embodiment, compensator cell 16 corrects for the frame response effect only in the OFF optical state. Skilled persons will appreciate that compromising the contrast ratio achieved by compensating the frame response effect in the OFF optical state could improve the frame response effect in the ON optical state but at the expense of an overall decrease in contrast ratio. This could be done by causing driver 44 to apply a constant select data voltage to common electrode 34 and thereby compensate display panel 10 to the white state.

As an alternative, compensator cell 16 need not have the same number of row electrodes 32 in one-to-one correspondence to the number of row electrodes 26 in matrix display cell 14. For example, compensator cell 16 could include multiple electrode bars, each of which of a width equal to the total width of, for example, 8, 16, or 32 row electrodes, and be driven in spatial alignment with corresponding row electrodes 26 of matrix display panel 14. The phase difference between a selected row electrode 26 and compensator bar must be sufficiently small to obtain the necessary spatial association that achieves frame response effect compensation.

Skilled persons will appreciate that the invention may be implemented in dual scan panels in a manner that renders more homogeneous the effect of the frame response compensation. For example, the scan of the display elements may proceed from top to bottom of one panel and bottom to top of the other panel or from the middle toward the top of one panel and from the middle toward the bottom of the other panel. These alternative techniques for scanning toward or away from the middle of the dual scan panels would help prevent incidental compensation of one panel by compensation intended for the other panel.

It will be obvious to those having skill in the art that many changes may be made to the details of the above-described preferred embodiments of the present invention without departing from the underlying principles thereof. For example, the row drive waveforms need not strictly obey the equations governing Alt and Pleshko waveforms. The scope of the present invention should, therefore, be determined only by the following claims.

We claim:

1. A driving method for a passive matrix display system including a display device of an optically retarding type having an optic axis and overlapping first and second electrodes positioned on opposite sides of a supertwisted nematic liquid crystal material to define an array of display elements, the first electrodes receiving corresponding first drive signals during a frame period to cause sequential selections of the first electrodes during the frame period, the second electrodes receiving corresponding second drive signals during the selections of the first electrodes to provide a desired information pattern on the display elements, and the supertwisted nematic liquid crystal material instantaneously responding to the first drive signals and thereby resulting in a transient change in display element transmittance before returning to a quiescent state corresponding to a lower rms voltage over the remainder of the frame period, the method comprising:

providing a compensator device of an optically retarding type having first electrodes and a reference electrode structure positioned on opposite sides of a supertwisted nematic liquid crystal material, the compensator device having an optic axis;

positioning the compensator device in optical association with the display device so that the first electrodes of the display device and the first electrodes of the compensator device spatially overlap and are parallel to one another and so that the optic axis of the display device and the optic axis of the compensator device intersect at a predetermined angle;

applying the first drive signals concurrently to the first electrodes of the display device and to the first electrodes of the compensator device, the compensator device and display device producing offsetting changing amounts of retardation during the frame period to prevent a significant decrease in contrast ratio;

applying the second drive signals to the second electrodes of the display device to provide the desired information pattern on the display elements; and applying a reference signal to the reference electrode structure.

2. The method of claim 1 in which the optic axes of the display device and the compensator device intersect at an angle of 90 degrees.

3. The method of claim 1 in which each of the display and compensator devices includes a liquid crystal material having directors and a thickness dimension, the directors in the direction of the thickness dimension of the display device being of opposite rotational sense to that of the directors in the direction of the thickness dimension of the compensating device.

4. The method of claim 1 in which the first drive signals are of an Alt and Pleshko sequential waveform type.

5. The method of claim 1 in which the number of first electrodes of the display device is equal to the number of first electrodes of the compensator device.

6. A frame response-compensated passive matrix display system, comprising:

a matrix display cell of an optically retarding type having an optic axis and overlapping first and second electrodes positioned on opposite sides of a supertwisted nematic liquid crystal material to define an array of display elements, the liquid crystal material having a thickness dimension and directors to which a twist angle is imparted along the thickness dimension;

a compensating cell of an optically retarding type having an optic axis, a reference electrode, and first electrodes positioned adjacent a supertwisted nematic liquid crystal material, the optic axes of the matrix display and compensating cells being set at a predetermined angle, the first electrodes being spatially associated with and oriented parallel to the first electrodes of the matrix display cell, and the liquid crystal material having a thickness dimension and directors to which a twist angle is imparted along the thickness dimension, the twist angle of the liquid crystal material of the compensator cell being of opposite rotational sense to that of the liquid crystal material of the matrix display cell;

a first drive circuit applying first signals concurrently to select the first electrodes of the matrix display cell and the spatially associated first electrodes of the compensator cell; and second drive circuits applying a reference signal to the reference electrode and second signals to corresponding second electrodes of the matrix display cell during the selections of the first electrodes to provide a desired information pattern on the display elements, the liquid crystal materials of the matrix and compensating cells instantaneously responding to the first signals and producing offsetting changing amounts of retardation that prevent a resultant transient change in display element transmittance.

7. The system of claim 6 in which the optic axes of the matrix display and compensator cells are set at 90 degrees relative to each other.

8. The system of claim 6 in which the liquid crystal material in the display matrix and compensator cells have the same helical pitch.

9. The system of claim 6 in which the first signals are of an Alt and Pleshko sequential waveform type.

10. The system of claim 6 in which the number of first electrodes of the display matrix cell is equal to the number of first electrodes of the compensator cell.

* * * * *